(12) United States Patent
Mathew et al.

(10) Patent No.: US 9,830,215 B1
(45) Date of Patent: Nov. 28, 2017

(54) COMPUTING SYSTEM ERROR ANALYSIS BASED ON SYSTEM DUMP DATA

(71) Applicant: EMC Corporation, Hopkinton, MA (US)

(72) Inventors: Sudeep Abraham Mathew, Karnataka (IN); Krishna Mohan Gudipudi, Karnataka (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/745,376

(22) Filed: Jun. 19, 2015

(51) Int. Cl.
G06F 9/44 (2006.01)
G06F 11/07 (2006.01)
G06F 9/445 (2006.01)
H04L 29/08 (2006.01)

(52) U.S. Cl.
CPC ............. G06F 11/079 (2013.01); G06F 8/65 (2013.01); G06F 11/0751 (2013.01); G06F 11/0778 (2013.01); G06F 11/0793 (2013.01); H04L 67/10 (2013.01)

(58) Field of Classification Search
None
See application file for complete search history.

(56) References Cited

U.S. PATENT DOCUMENTS

2008/0301501 A1* 12/2008 Grant .................... G06F 11/079
714/37

* cited by examiner

Primary Examiner — Craig Dorais
(74) Attorney, Agent, or Firm — BainwoodHuang

(57) ABSTRACT

Described are methods, systems, and apparatus, including computer program products for analyzing system dumps. A method for analyzing a first system dump is performed by a computing system. The first system dump is received by the computing system, the first system dump generated by a first server in response to the first server detecting a first error. First diagnostic data are extracted, by the computing system, from the first system dump, the first diagnostic data comprising at least first call stack data for the first server. Second diagnostic data are identified by the computing system that are indicative of the first error by comparing the first call stack data of the first diagnostic data to second call stack data of the second diagnostic data.

17 Claims, 3 Drawing Sheets

COMPUTING SYSTEM ERROR ANALYSIS BASED ON SYSTEM DUMP DATA

FIELD OF THE TECHNOLOGY

The present technology relates generally to analysis of computing systems and, more specifically, to analyzing system dump data to automatically identify known errors.

BACKGROUND

Computing systems, such as PCs, servers, storage systems, etc., can include functionality for capturing system dumps when errors occur and/or are subsequently detected. For example, when a server crashes or detects an unpermitted state, the server can generate a system dump. A system dump can include a variety of data related to a computing system's state at the time the dump is generated. For example, a system dump can include some or all of the information stored in the computing device's volatile storage (e.g., registers, RAM, etc.). A system dump can include information about the call stack (or call stacks) executing at the time the dump is generated, including e.g., stack frames, stack pointers, and/or stack variables. A system dump can include thread attributes. A system dump can include other information from the computing system's memory, such as from the heap.

SUMMARY

The contents of a system dump can provide information about the error that caused the system dump to be generated. In some instances, the error may be known (e.g., when other systems have encountered the error). When the error has already been identified (and possibly resolved) in one or more computing systems, it is beneficial to be able to identify when other systems are encountering the same error. Accordingly, there is a need for technology that facilitates system dump analysis to identify known errors.

In one aspect, there is a method performed by a computing system for analyzing a first system dump. The method includes receiving, by the computing system, the first system dump, the first system dump generated by a first server in response to the first server detecting a first error. The method includes extracting, by the computing system, from the first system dump, first diagnostic data, the first diagnostic data including at least first call stack data for the first server. The method includes identifying, by the computing system, second diagnostic data that are indicative of the first error by comparing the first call stack data of the first diagnostic data to second call stack data of the second diagnostic data.

In some embodiments, the method can include identifying, by the computing system, based on the second diagnostic data, a software update for resolving the first error. In some embodiments, the method can include transmitting, by the computing system, the software update to the first server. In some embodiments, the method can include sending, by the computing system, a notification that the second diagnostic data is indicative of the first error. In some embodiments, comparing the first call stack data of the first diagnostic data to the second call stack data of the second diagnostic data can include determining, by the computing device, first one or more function calls in the first call stack data match second one or more function calls in the second call stack data. In some embodiments, comparing the first call stack data of the first diagnostic data to the second call stack data of the second diagnostic data can include determining, by the computing device, first one or more variables in the first call stack data match second one or more variables in the second call stack data. In some embodiments, the first diagnostic data further include first thread attributes and the second diagnostic data further include second thread attributes, and the method can include identifying, by the computing system, the second diagnostic data that are indicative of the first error by comparing the first thread attributes and the second thread attributes. In some embodiments, the method can include extracting, by the computing system, from a second system dump generated by a second server in response to the second server detecting the first error, the second diagnostic data. In some embodiments, the method can include storing, by the computing system, the second diagnostic data.

In another aspect, there is a computing system. The computing system includes a diagnostic data repository storing a plurality of diagnostic data. The computing system includes a resolution module, wherein the resolution module is configured to: detect receipt of a first system dump, the first system dump generated by a first server in response to the first server detecting a first error; extract, from the first system dump, first diagnostic data, the first diagnostic data including at least first call stack data for the first server; and identify second diagnostic data of the plurality of diagnostic data that are indicative of the first error by comparing the first call stack data of the first diagnostic data to second call stack data of the second diagnostic data.

In some embodiments, the resolution module is configured to: identify, based on the second diagnostic data, a software update for resolving the first error; and transmit the software update to the first server. In some embodiments, the resolution module is configured to send a notification that the second diagnostic data is indicative of the first error. In some embodiments, the resolution module is configured to compare the first call stack data of the first diagnostic data to the second call stack data of the second diagnostic data by determining first one or more function calls in the first call stack data match second one or more function calls in the second call stack data. In some embodiments, the resolution module is configured to compare the first call stack data of the first diagnostic data to the second call stack data of the second diagnostic data by determining first one or more variables in the first call stack data match second one or more variables in the second call stack data. In some embodiments, the first diagnostic data further include first thread attributes and the second diagnostic data further include second thread attributes, and wherein the resolution module is configured to identify the second diagnostic data that are indicative of the first error by comparing the first thread attributes and the second thread attributes. In some embodiments, the resolution module is further configured to extract from a second system dump generated by a second server in response to the second server detecting the first error, the second diagnostic data; and store the second diagnostic data.

In another aspect, there is a computer program product, tangibly embodied in a non-transitory computer readable storage medium, including instructions being operable to cause a computing system to: detect receipt of a first system dump, the first system dump generated by a first server in response to the first server detecting a first error; extract from the first system dump, first diagnostic data, the first diagnostic data including at least first call stack data for the first server; and identify second diagnostic data that are indicative of the first error by comparing the first call stack data of the first diagnostic data to second call stack data of the second diagnostic data.

In some embodiments, the computer program product can include instructions being operable to cause the computing system to identify, based on the second diagnostic data, a software update for resolving the first error; and transmit the software update to the first server. In some embodiments, the computer program product can include instructions being operable to cause the computing system to send a notification that the second diagnostic data is indicative of the first error. In some embodiments, the instructions to compare the first call stack data of the first diagnostic data to the second call stack data of the second diagnostic data can include instructions to determine first one or more function calls in the first call stack data match second one or more function calls in the second call stack data. In some embodiments, instructions to compare the first call stack data of the first diagnostic data to the second call stack data of the second diagnostic data can include instructions to determine first one or more variables in the first call stack data match second one or more variables in the second call stack data. In some embodiments, the first diagnostic data further include first thread attributes and the second diagnostic data further include second thread attributes, and the computer program product can include instructions being operable to cause the computing system to identify the second diagnostic data that are indicative of the first error by comparing the first thread attributes and the second thread attributes.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which.

DETAILED DESCRIPTION

In some exemplary applications, the technology can facilitate analyzing a system dump generated by a computing system to determine whether a known error caused the computing system to generate the system dump. For example, in some applications, the technology can facilitate analyzing and resolving errors on customer computing systems. In some instances, when a customer computing system encounters an error, the computing system can generate a system dump and upload the system dump to a repository for analysis and resolution of the error. The system dump can be investigated and a software update can be developed to resolve the error. In some cases, other customer systems can encounter the same error and generate system dumps. When a second customer computing system generates a system dump as the result of the same error, the second computing system can upload the system dump to the repository for analysis. In some embodiments, the technology can detect the new system dump and extract diagnostic data from the system dump. The technology can compare the diagnostic data to previously collected diagnostic data (e.g., diagnostic data collected from the system dump from the first customer system) to determine if the diagnostic data is indicative of the same error as the previously collected diagnostic data. If so, the technology can determine can identify the error and, if available, provide a software update for resolving the error to the customer computing system.

Figure 1:
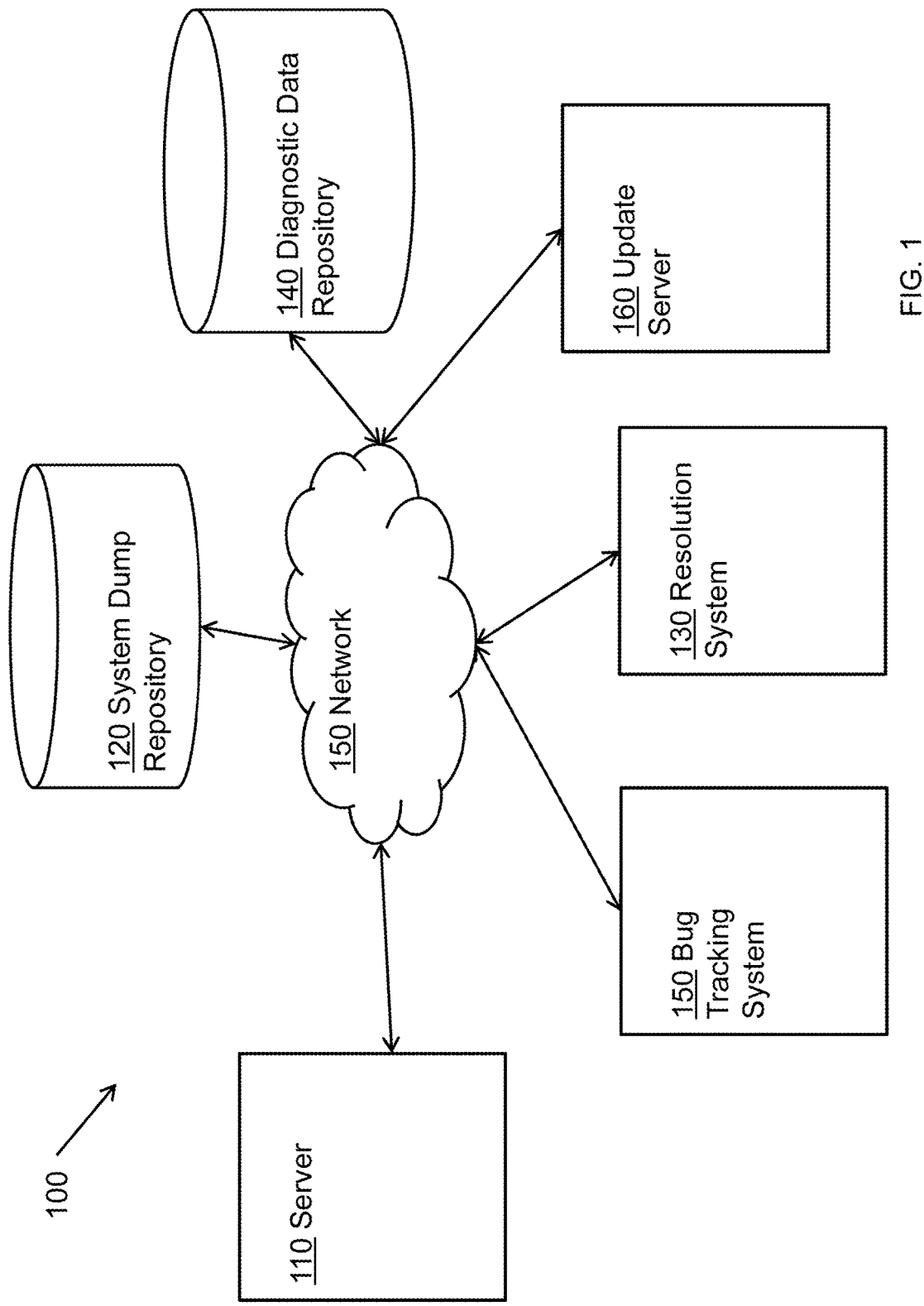
FIG. 1 illustrates a computing environment.

FIG. 1 illustrates computing environment 100. Computing environment 100 includes server 110, system dump repository 120, resolution system 130, diagnostic data repository 140, bug tracking system 150, and update server 160. As illustrated, server 110, system dump repository 120, resolution system 130, diagnostic data repository 140, bug tracking system 150, and update server 160 can be in network communications via network 150. Server 110 can be a computing device configured to generate a system dump in some instances, such as when the state of server 110 indicates that an error has occurred. System dump repository 120 can be a computing device, database, or other form of storage capable of storing system dumps. In some embodiments, server 110 can be configured to upload or store system dumps to system dump repository 120. In some embodiments, server 110 can upload a system dump shortly after it has been generated. In some embodiments, server 110 can upload a system dump once server 110 is restarted.

In computing environment 100, resolution system 130 can be a computing device configured to analyze system dumps, as described in greater detail below. Diagnostic data repository 140 can be a computing device, server, database, or other form of storage capable of storing diagnostic data extracted from system dumps. Bug tracking system 160 can be a computing device configured to store and provide access to bug records (e.g., bug records tracking errors encountered by computing devices). In some embodiments, a bug record can be associated with a system dump stored on system dump repository 120 and/or diagnostic data stored on diagnostic data repository 140. For example, when a server (e.g., server 110) uploads a system dump to system dump repository 120, a bug record can be created on bug tracking system 160 that identifies the server, the system dump on system dump repository 120, and/or the diagnostic data extracted from the system dump and stored on diagnostic data repository 140. Update server 160 can be a computing system for storing software updates. In some embodiments, a bug record on bug tracking system 160 can be associated with a software update stored on update server 160. For example, the bug record can refer to a software update that resolves the error for which the bug record was created.

It should be appreciated that other computing environments are contemplated. For example, in some embodiments one or more of system dump repository 120, resolution system 130, diagnostic data repository 140, bug tracking system 150, and update server 160 can be on a single computing system. In some embodiments, server 110, system dump repository 120, and update server 160 can communicate via a first network, and system dump repository 120, resolution system 130, diagnostic data repository 140, bug tracking system 150, and update server 160 can communicate via a second network.

Figure 2:
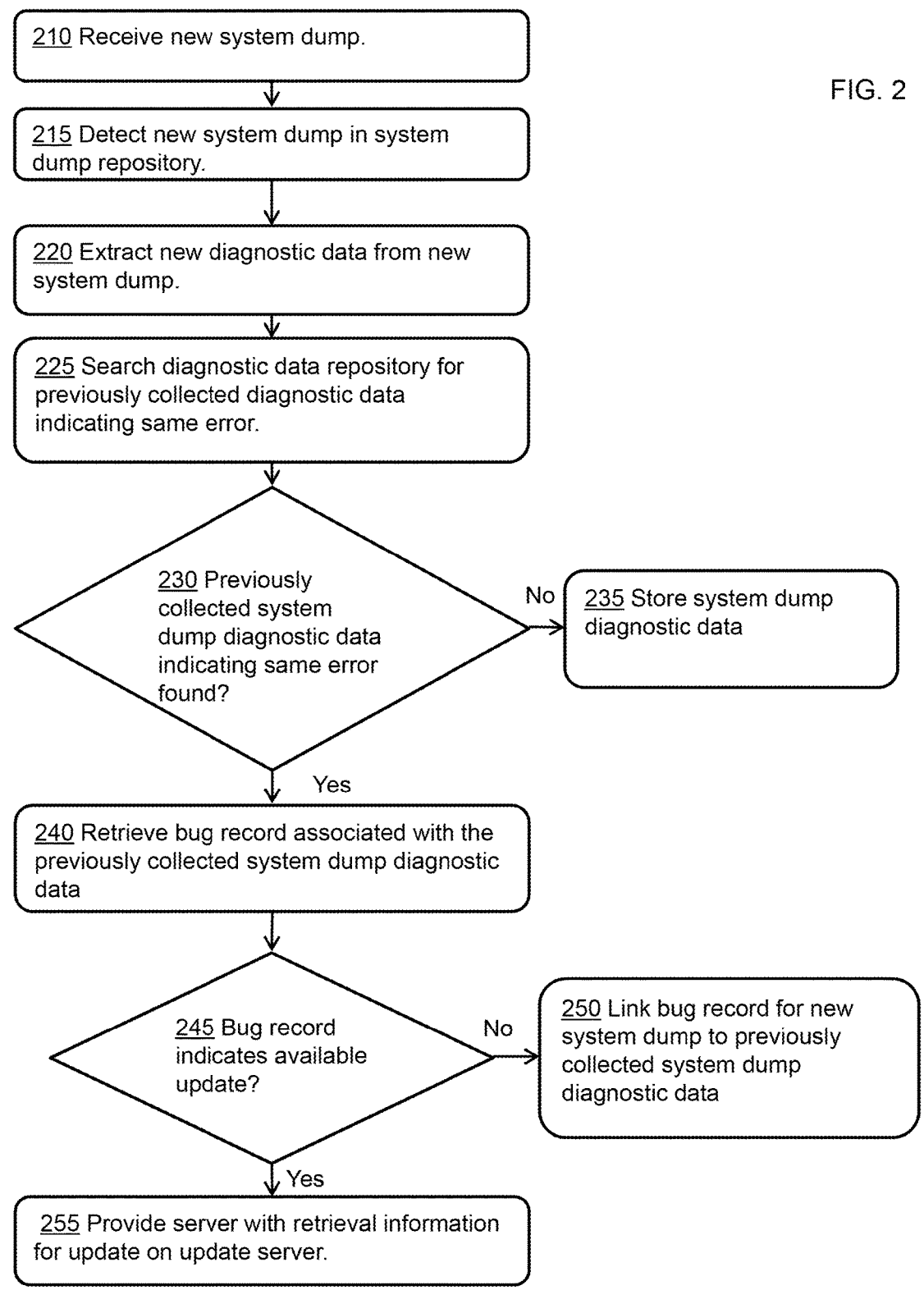
FIG. 2 is a flowchart illustrating a method of analyzing a system dump in accordance with the technology.

FIG. 2 is a flowchart illustrating a method of analyzing a system dump in accordance with the technology. In some embodiments, the illustrated method can be implemented in computing environment 100 of FIG. 1. At step 210, a new system dump is received, e.g., as a result of a computing system encountering an error. For example, server 110 can generate a system dump after encountering an error. As described above, server 110 can be configured to automatically upload the new system dump to system dump repository 120. At step 215, the new system dump in system dump repository 120 is detected. For example, resolution system 130 can detect a new system dump uploaded by server 110 to system dump repository 120. In some embodiments, resolution system 130 can monitor system dump repository 120 for new system dumps. In some embodiments, system dump repository 120 can send a message to resolution system 130 indicating that a new system dump has been uploaded.

At step 220, new diagnostic data are extracted from the new system dump. For example, resolution system 130 can extract new diagnostic data from the new system dump uploaded to system dump repository 120 by server 110. In some embodiments, the new diagnostic data can include call stack data extracted from the new system dump. In some embodiments, the new diagnostic data can include variables from the call stack. In some embodiments, the new diagnostic data can include thread attributes extracted from the new system dump. In some embodiments, the new diagnostic data can include register values. In some embodiments, the new diagnostic data can include one or more stings containing the function names on the call stack, one or more variables from the call stack, one or more thread attributes extracted from the new system dump, and/or one or more register values extracted from the new system dump. In some embodiments, the diagnostic data can be extracted by resolution system 130 running GDB (Gnu Project Debugger) on the new system dump to extract, e.g., the call stack and/or other variables. It should be appreciated that diagnostic data can include other data from the system dump as well.

At step 225, the diagnostic data repository is searched for previously collected diagnostic data indicating the same error. For example, resolution system 130 can search diagnostic data repository 140 for previously collected diagnostic data indicating the same error. In some embodiments, diagnostic data repository 140 can store diagnostic data extracted from previously received system dumps. For example, diagnostic data repository 140 can store as previously collected diagnostic data extracted from a previously received system dump, one or more strings containing functions names from the call stack extracted from the previously received system dump. Resolution system 130 can compare the new diagnostic data to the previously collected diagnostic data from one or more previously received dumps. For example, resolution system 130 can compare the function names from the call stack in the first diagnostic data to the function names from the call stack in the previously collected diagnostic data from a previously received dump. If the call stacks match, resolution system 130 can determine that the first diagnostic data are indicative of the same as error as the previously collected diagnostic data. In some embodiments, resolution system 130 can compare variables from the call stack in the first diagnostic data to variables from the call stack in the previously collected diagnostic data. If the variables match, resolution system 130 can determine that the first diagnostic data are indicative of the same error as the previously collected diagnostic data. In some embodiments, resolution system 130 can compare thread attributes in the first diagnostic data to thread attributes in the previously collected diagnostic data. If the thread attributes match, resolution system 130 can determine that the first diagnostic data are indicative of the same error as the previously collected diagnostic data. In some embodiments, resolution system 130 can compare register values in the first diagnostic data to register values in the previously collected diagnostic data. If the register values match, resolution system 130 can determine that the first diagnostic data are indicative of the same error as the previously collected diagnostic data. In some embodiments, resolution system 130 can compare function names from the call stack, variables from the call stack, thread attributes, and/or register values to determine whether the first diagnostic data are indicative of the same error as the previously collected diagnostic data.

At step 230, if no previously collected diagnostic data indicating the same error is found, the method proceeds to step 235. At step 235, the new diagnostic data is stored. For example, the new diagnostic data can be stored to diagnostic data repository 140. In some embodiments, a new bug record associated with the new diagnostic data is created on bug tracking system 150. At step 230, if previously collected diagnostic data indicating the same error is found, the method proceeds to step 240. At step 240, a bug record associated with the previously collected diagnostic data is retrieved. For example, resolution system 130 can retrieve the bug record associated with the previously collected diagnostic data from bug tracking system 150. In some embodiments, the technology can send a notification (e.g., an email) that previously collected diagnostic data indicating the same error has been found.

At step 245, it is determined whether the bug record indicates an available software update for the error. For example, resolution system 130 can inspect the bug record associated with the previously collected diagnostic data to determine if a software update for the error is associated with the bug record. If a software update is not associated with the bug record, the method proceeds to step 250. At step 250, a bug record associated with the new system dump and/or the new diagnostic data is linked to the bug record associated with the previously collected diagnostic data (e.g., to indicate that the bug records relate to the same error). If a software update is associated with the bug record associated with the previously collected diagnostic data, the method proceeds to step 255. At step 255, the computing system that generated the new system dump is provided with information for the software update on the update server. For example, resolution system 130 can provide information to server 110 permitting the retrieval of the software update from update server 160.

Figure 3:
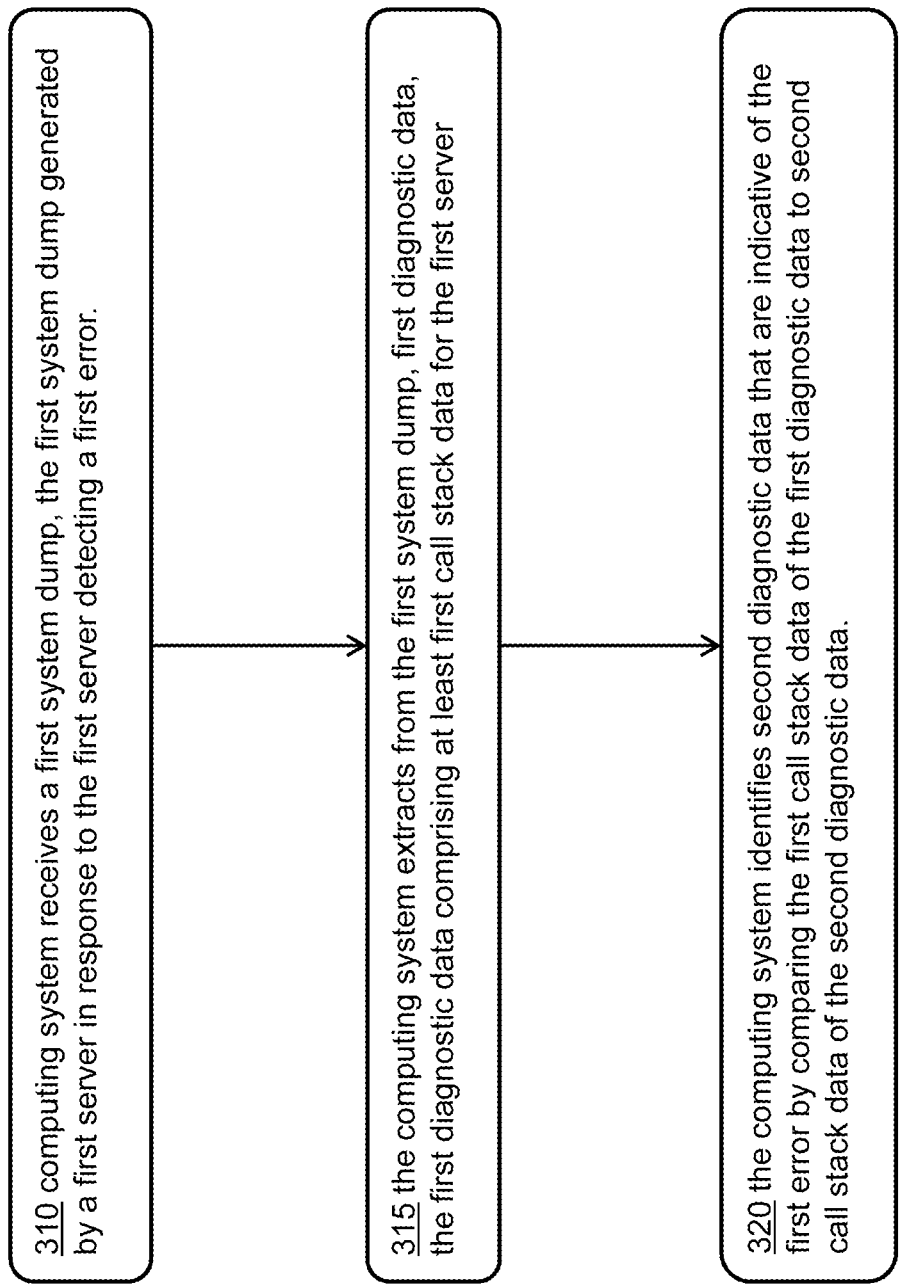
FIG. 3 is a flowchart illustrating a method of analyzing a system dump in accordance with the technology.

FIG. 3 is a flowchart illustrating a method of analyzing a system dump in accordance with the technology. At step 310, a computing system receives a first system dump, the first system dump generated by a first server in response to the first server detecting a first error. For example, as discussed above, system dump repository 120 can receive a first system dump generated by server 110, where server 110 generated the first system dump in response to detecting a first error. At step 315, the computing system extracts from the first system dump, first diagnostic data, the first diagnostic data comprising at least first call stack data for the first server. For example, as discussed above, resolution system 130 can extract from the first system dump, first diagnostic data. The first diagnostic data can include first call stack data for server 110. At step 320, the computing system identifies second diagnostic data that are indicative of the first error by comparing the first call stack data of the first diagnostic data to second call stack data of the second diagnostic data. For example, as described above, resolution system 130 can identify second diagnostic data that are indicative of the first error by comparing the first call stack data of the first diagnostic data to second call stack data of the second diagnostic data.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the technology by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The technology has been described in terms of particular embodiments. The alternatives described herein are examples for illustration only and not to limit the alternatives in any way. The steps of the technology can be performed in a different order and still achieve desirable results. Other embodiments are within the scope of the following claims.

What is claimed is:

1. A method performed by a computing system for analyzing a first system dump comprising:
   receiving, by the computing system, the first system dump, the first system dump generated by a first server in response to the first server detecting a first error;
   extracting, by the computing system, from the first system dump, first diagnostic data, the first diagnostic data comprising at least first call stack data for the first server; and
   identifying, by the computing system, second diagnostic data that are indicative of the first error by comparing the first call stack data of the first diagnostic data to second call stack data of the second diagnostic data,
   wherein comparing the first call stack data of the first diagnostic data to the second call stack data of the second diagnostic data comprises:
      comparing, by the computing device, first one or more variables in the first call stack data to second one or more variables in the second call stack data; and
      determining, by the computing device, the second diagnostic data are indicative of the first error when the first one or more variables in the first call stack data match the second one or more variables in the second call stack data.

2. The method of claim 1, further comprising:
   identifying, by the computing system, based on the second diagnostic data, a software update for resolving the first error; and
   transmitting, by the computing system, the software update to the first server.

3. The method of claim 1, further comprising:
   sending, by the computing system, a notification that the second diagnostic data is indicative of the first error.

4. The method of claim 1, wherein comparing the first call stack data of the first diagnostic data to the second call stack data of the second diagnostic data comprises:
   determining, by the computing device, first one or more function calls in the first call stack data match second one or more function calls in the second call stack data.

5. The method of claim 1 wherein the first diagnostic data further comprises first thread attributes and the second diagnostic data further comprises second thread attributes, the method further comprising:
  identifying, by the computing system, the second diagnostic data that are indicative of the first error by comparing the first thread attributes and the second thread attributes.

6. The method of claim 1, further comprising:
  extracting, by the computing system, from a second system dump generated by a second server in response to the second server detecting the first error, the second diagnostic data;
  storing, by the computing system, the second diagnostic data.

7. A computing system comprising:
  a diagnostic data repository storing a plurality of diagnostic data;
  a resolution module, wherein the resolution module is configured to:
    detect receipt of a first system dump, the first system dump generated by a first server in response to the first server detecting a first error;
    extract, from the first system dump, first diagnostic data, the first diagnostic data comprising at least first call stack data for the first server; and
    identify second diagnostic data of the plurality of diagnostic data that are indicative of the first error by comparing the first call stack data of the first diagnostic data to second call stack data of the second diagnostic data,
    wherein the resolution module is configured to compare the first call stack data of the first diagnostic data to the second call stack data of the second diagnostic data by:
      comparing first one or more variables in the first call stack data to second one or more variables in the second call stack data; and
      determining the second diagnostic data are indicative of the first error when the first one or more variables in the first call stack data match the second one or more variables in the second call stack data.

8. The computing system of claim 7, wherein the resolution module is configured to:
  identify, based on the second diagnostic data, a software update for resolving the first error; and
  transmit the software update to the first server.

9. The computing system of claim 7, wherein the resolution module is configured to:
  send a notification that the second diagnostic data is indicative of the first error.

10. The computing system of claim 7, wherein the resolution module is configured to compare the first call stack data of the first diagnostic data to the second call stack data of the second diagnostic data by:
  determining first one or more function calls in the first call stack data match second one or more function calls in the second call stack data.

11. The computing system of claim 7 wherein the first diagnostic data further comprises first thread attributes and the second diagnostic data further comprises second thread attributes, and wherein the resolution module is configured to:
  identify the second diagnostic data that are indicative of the first error by comparing the first thread attributes and the second thread attributes.

12. The computing system of claim 7, wherein the resolution module is further configured to:
  extract from a second system dump generated by a second server in response to the second server detecting the first error, the second diagnostic data;
  store the second diagnostic data.

13. A computer program product, tangibly embodied in a non-transitory computer readable storage medium, including instructions being operable to cause a computing system to:
  detect receipt of a first system dump, the first system dump generated by a first server in response to the first server detecting a first error;
  extract from the first system dump, first diagnostic data, the first diagnostic data comprising at least first call stack data for the first server; and
  identify second diagnostic data that are indicative of the first error by comparing the first call stack data of the first diagnostic data to second call stack data of the second diagnostic data,
  wherein the instructions to compare the first call stack data of the first diagnostic data to the second call stack data of the second diagnostic data comprise instructions to:
    compare first one or more variables in the first call stack data to second one or more variables in the second call stack data; and
    determine the second diagnostic data are indicative of the first error when the first one or more variables in the first call stack data match the second one or more variables in the second call stack data.

14. The computer program product of claim 13, further comprising instructions being operable to cause the computing system to:
  identify, based on the second diagnostic data, a software update for resolving the first error; and
  transmit the software update to the first server.

15. The computer program product of claim 13, further comprising instructions being operable to cause the computing system to:
  send a notification that the second diagnostic data is indicative of the first error.

16. The computer program product of claim 13, wherein the instructions to compare the first call stack data of the first diagnostic data to the second call stack data of the second diagnostic data comprise instructions to:
  determine first one or more function calls in the first call stack data match second one or more function calls in the second call stack data.

17. The computer program product of claim 13 wherein the first diagnostic data further comprises first thread attributes and the second diagnostic data further comprises second thread attributes, the computer program product further comprising instructions being operable to cause the computing system to:
  identify the second diagnostic data that are indicative of the first error by comparing the first thread attributes and the second thread attributes.

* * * * *